(12) United States Patent
Lee et al.

(10) Patent No.: US 9,019,736 B2
(45) Date of Patent: Apr. 28, 2015

(54) DC-TO-AC POWER CONVERSION SYSTEM AND METHOD OF OPERATING THE SAME

(71) Applicant: Delta Electronics, Inc., Taoyuan County (TW)

(72) Inventors: Lei-Ming Lee, Taoyuan County (TW); Chen-Wei Ku, Taoyuan County (TW); Ho Huang, Taoyuan County (TW)

(73) Assignee: Delta Electronics, Inc. (TW)

( * ) Notice: Subject to any disclaimer, the term of this patent is extended or adjusted under 35 U.S.C. 154(b) by 145 days.

(21) Appl. No.: 13/940,781

(22) Filed: Jul. 12, 2013

(65) Prior Publication Data

US 2014/0301123 A1    Oct. 9, 2014

(30) Foreign Application Priority Data

Apr. 3, 2013   (TW) .............................. 102112008 A

(51) Int. Cl.
| | |
|---|---|
| *H02M 7/537* | (2006.01) |
| *H02M 7/5387* | (2007.01) |
| *H02M 1/15* | (2006.01) |
| *H02M 1/34* | (2007.01) |

(52) U.S. Cl.
CPC .............. *H02M 7/5387* (2013.01); *H02M 1/15* (2013.01); *H02M 7/53871* (2013.01); *H02M 2001/342* (2013.01); *Y02B 70/1491* (2013.01)

(58) Field of Classification Search
CPC ... H02M 1/12; H02M 2001/123; H02M 1/15; H02M 1/14; H02M 7/66; H02M 7/79; H02M 7/68; H02M 7/5387; H02M 7/53871; H02M 7/53873; H02M 2007/53878
USPC ........ 363/39, 40, 131, 132, 17, 56.02, 98, 65, 363/71, 95, 97
See application file for complete search history.

(56) References Cited

U.S. PATENT DOCUMENTS

| | | | | |
|---|---|---|---|---|
| 6,111,770 | A  * | 8/2000 | Peng .............................. | 363/131 |
| 2013/0114321 | A1* | 5/2013 | Zhang ........................... | 363/132 |
| 2013/0235628 | A1* | 9/2013 | Dong et al. ..................... | 363/47 |
| 2013/0329471 | A1* | 12/2013 | Escobar et al. ................. | 363/40 |
| 2014/0169054 | A1* | 6/2014 | Ogawa .......................... | 363/132 |
| 2014/0241016 | A1* | 8/2014 | Ho et al. ........................ | 363/40 |

* cited by examiner

*Primary Examiner* — Timothy J Dole
*Assistant Examiner* — Shahzeb K Ahmad
(74) *Attorney, Agent, or Firm* — Lowe Hauptman & Ham, LLP

(57) ABSTRACT

A DC-to-AC power conversion system is provided to convert a DC input voltage into an AC output voltage, which mainly includes a bridge switching circuit, an auxiliary switch circuit, and a control circuit. The bridge switching circuit has a first power switch, a second power switch, a third power switch, and a fourth power switch. The auxiliary switch circuit has a fifth power switch, a sixth power switch, a seventh power switch, and an eighth power switch. The control circuit produces a complementary switching signal pair to control the first and fourth power switches and the second and third power switches, respectively. In addition, the control circuit produces a complementary level signal pair to control the sixth and seventh power switches and the fifth and eighth power switches, respectively.

20 Claims, 14 Drawing Sheets

DC-TO-AC POWER CONVERSION SYSTEM AND METHOD OF OPERATING THE SAME

BACKGROUND

1. Technical Field

The present disclosure relates generally to a DC-to-AC power conversion system and a method of operating the same, and more particularly to a DC-to-AC power conversion system and a method of operating the same which are provided to reduce leakage currents caused by parasitic capacitance voltages.

2. Description of Related Art

Reference is made to FIG. 1 which is a circuit diagram of a prior art full-bridge inverter. Under the zero voltage condition, the full-bridge inverter is provided to decouple the DC side and the AC side. In theory, under the zero voltage condition, the voltage between point A and point N (referred to as "$V_{AN}$" hereinafter) and the voltage between point B and point N (referred to as "$V_{BN}$" hereinafter are a half of the DC voltage Vdc, namely, $V_{AN}=V_{BN}=1/2$ Vdc. Hence, the common mode voltage of the point A and the point B is fixed to reduce leakage currents Icp1, Icp2 caused by parasitic capacitance voltages. However, the leakage current Icp1, Icp2 would be rapidly changed once the parasitic capacitance voltages of the parasitic capacitances Cp1, Cp2 significantly change because the zero voltage conditions occur under the exchanging phase of the AC source. That is, the leakage currents get larger as the variation of the parasitic capacitance voltages gets larger. In fact, the voltage $V_{AN}$ and the voltage $V_{BN}$ are not exactly equal to a half of the DC voltage Vdc because the characteristics of circuit components and the parasitic capacitances Cp1, Cp2 are not identical, so that the common mode voltage of the point A and the point B is not fixed.

Accordingly, it is desirable to provide a DC-to-AC power conversion system and a method of operating the same so that an auxiliary switch circuit is used to provide energy-releasing loops. Also, the auxiliary switch circuit is connected to the neutral point to significantly reduce leakage currents caused by parasitic capacitance voltages.

SUMMARY

An object of the present disclosure is to provide a DC-to-AC power conversion system to solve the above-mentioned problems. Accordingly, the DC-to-AC power conversion system is provided to convert a DC input voltage into an AC output voltage. The DC-to-AC power conversion system includes an input capacitor set, a bridge switching circuit, an auxiliary switch circuit, a filter circuit, and a control circuit. The input capacitor set has a first capacitor and a second capacitor. The first capacitor and the second capacitor are connected to a neutral point and configured to receive the DC input voltage. The bridge switching circuit is connected in parallel to the input capacitor set. The bridge switching circuit has a first bridge arm and a second bridge arm connected in parallel to the first bridge arm. The first bridge arm is composed of a first power switch and a second power switch connected in series to the first power switch. The second bridge arm is composed of a third power switch and a fourth power switch connected in series to the third power switch. The auxiliary switch circuit is connected between the neutral point and the bridge switching circuit. The auxiliary switch circuit has a third bridge arm and a fourth bridge arm connected in parallel to the third bridge arm. The third bridge arm is composed of a fifth power switch and a sixth power switch connected in series to the fifth power switch. The fourth bridge arm is composed of a seventh power switch and an eighth power switch connected in series to the seventh power switch. The filter circuit has a first filter inductor, a second filter inductor, and a filter capacitor. The filter capacitor is connected between the first filter inductor and the second filter inductor. The first filter inductor is connected to the first bridge arm and the third bridge arm, and the second filter inductor is connected to the second bridge arm and the fourth bridge arm. The control circuit produces a complementary switching signal pair and a complementary level signal pair. The complementary switching signal pair is configured to control the first and fourth power switches and the second and third power switches, respectively. The complementary level signal pair is configured to control the sixth and seventh power switches and the fifth and eighth power switches, respectively. In particular, the auxiliary switch circuit is configured to provide the energy-releasing loops of the first filter inductor and the second filter inductor to reduce leakage currents of the DC input voltage caused by parasitic capacitance voltages.

Another object of the present disclosure is to provide a DC-to-AC power conversion system to solve the above-mentioned problems. Accordingly, the DC-to-AC power conversion system is provided to convert a DC input voltage into an AC output voltage. The DC-to-AC power conversion system includes an input capacitor set, a first bridge switching circuit, a first auxiliary switch circuit, a second bridge switching circuit, a second auxiliary switch circuit, a first filter circuit, a second filter circuit, and a control circuit. The input capacitor set has a first capacitor and a second capacitor, and the first capacitor and the second capacitor are connected to a neutral point and configured to receive the DC input voltage. The first bridge switching circuit is connected in parallel to the input capacitor set, and the first bridge switching circuit has a first bridge arm and a second bridge arm connected in parallel to the first bridge arm. The first bridge arm is composed of a first power switch and a fifth diode connected in series to the first power switch, and the second bridge arm is composed of a second power switch and a sixth diode connected in series to the second power switch. The first auxiliary switch circuit is connected between the neutral point and the first bridge switching circuit, and the first auxiliary switch circuit has a third bridge arm and a fourth bridge arm connected in parallel to the third bridge arm. The third bridge arm is composed of a third power switch and a seventh diode connected in series to the third power switch, and the fourth bridge arm is composed of a fourth power switch and an eighth diode connected in series to the fourth power switch. The second bridge switching circuit is connected in parallel to the input capacitor set, and the second bridge switching circuit has a first bridge arm and a second bridge arm connected in parallel to the first bridge arm. The first bridge arm is composed of a first power switch and a fifth diode connected in series to the first power switch, and the second bridge arm is composed of a second power switch and a sixth diode connected in series to the second power switch. The second auxiliary switch circuit is connected between the neutral point and the second bridge switching circuit, and the second auxiliary switch circuit has a third bridge arm and a fourth bridge arm connected in parallel to the third bridge arm. The third bridge arm is composed of a third power switch and a seventh diode connected in series to the third power switch, and the fourth bridge arm is composed of a fourth power switch and an eighth diode connected in series to the fourth power switch. The first filter circuit has a first filter inductor, a second filter inductor, and a filter capacitor. The filter capacitor is connected between the first filter inductor and the second filter inductor, the first filter inductor is connected to the first bridge arm of the first bridge switching circuit and the third bridge arm of the first auxiliary switch circuit, and the second filter inductor is connected to the second bridge arm of the first bridge switching circuit and the fourth bridge arm of the first auxiliary switch circuit. The second filter circuit has a first filter inductor, a second filter inductor, and the filter capacitor. The filter capacitor is connected between the first filter inductor and the second filter inductor, the first filter inductor is connected to the first bridge arm of the second bridge switching circuit and the third bridge arm of the second auxiliary switch circuit, and the second filter inductor is connected to the second bridge arm of the second bridge switching circuit and the fourth bridge arm of the second auxiliary switch circuit. The control circuit is configured to produce a complementary switching signal pair and a complementary level signal pair. The complementary switching signal pair is configured to control the first and second power switches of the first bridge switching circuit and the first and second power switches of the second bridge switching circuit, respectively. The complementary level signal pair is configured to control the third and fourth power switches of the first auxiliary switch circuit and the third and fourth power switches of the second auxiliary switch circuit, respectively. In particular, the first auxiliary switch circuit is configured to provide the energy-releasing loops of the first filter inductor and the second filter inductor of the first filter circuit and the second auxiliary switch circuit is configured to provide the energy-releasing loops of the first filter inductor and the second filter inductor of the second filter circuit to reduce leakage currents of the DC input voltage caused by parasitic capacitance voltages.

Further another object of the present disclosure is to provide a method of operating a DC-to-AC power conversion system to solve the above-mentioned problems. Accordingly, the method includes following steps: (a) providing an input capacitor set, the input capacitor set having a first capacitor and a second capacitor, and the first capacitor and the second capacitor connected to a neutral point and configured to receive the DC input voltage; (b) providing a bridge switching circuit, the bridge switching circuit connected in parallel to the input capacitor set, and the bridge switching circuit having a first bridge arm and a second bridge arm connected in parallel to the first bridge arm; wherein the first bridge arm is composed of a first power switch and a second power switch connected in series to the first power switch, and the second bridge arm is composed of a third power switch and a fourth power switch connected in series to the third power switch; (c) providing an auxiliary switch circuit, the auxiliary switch circuit connected between the neutral point and the bridge switching circuit, and the auxiliary switch circuit having a third bridge arm and a fourth bridge arm connected in parallel to the third bridge arm; wherein the third bridge arm is composed of a fifth power switch and a sixth power switch connected in series to the fifth power switch, and the fourth bridge arm is composed of a seventh power switch and an eighth power switch connected in series to the seventh power switch; (d) providing a filter circuit, the filter circuit having a first filter inductor, a second filter inductor, and a filter capacitor; wherein the filter capacitor is connected between the first filter inductor and the second filter inductor, the first filter inductor is connected to the first bridge arm and the third bridge arm, and the second filter inductor is connected to the second bridge arm and the fourth bridge arm; (e) providing a control circuit, the control circuit configured to produce a complementary switching signal pair and a complementary level signal pair; wherein the complementary switching signal pair is configured to control the first and fourth power switches and the second and third power switches, respectively; the complementary level signal pair is configured to control the sixth and seventh power switches and the fifth and eighth power switches, respectively.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The features of the present disclosure believed to be novel are set forth with particularity in the appended claims. The present disclosure itself, however, may be best understood by reference to the following detailed description of the present disclosure, which describes an exemplary embodiment of the present disclosure, taken in conjunction with the accompanying drawings, in which:

DETAILED DESCRIPTION

Figure 1:
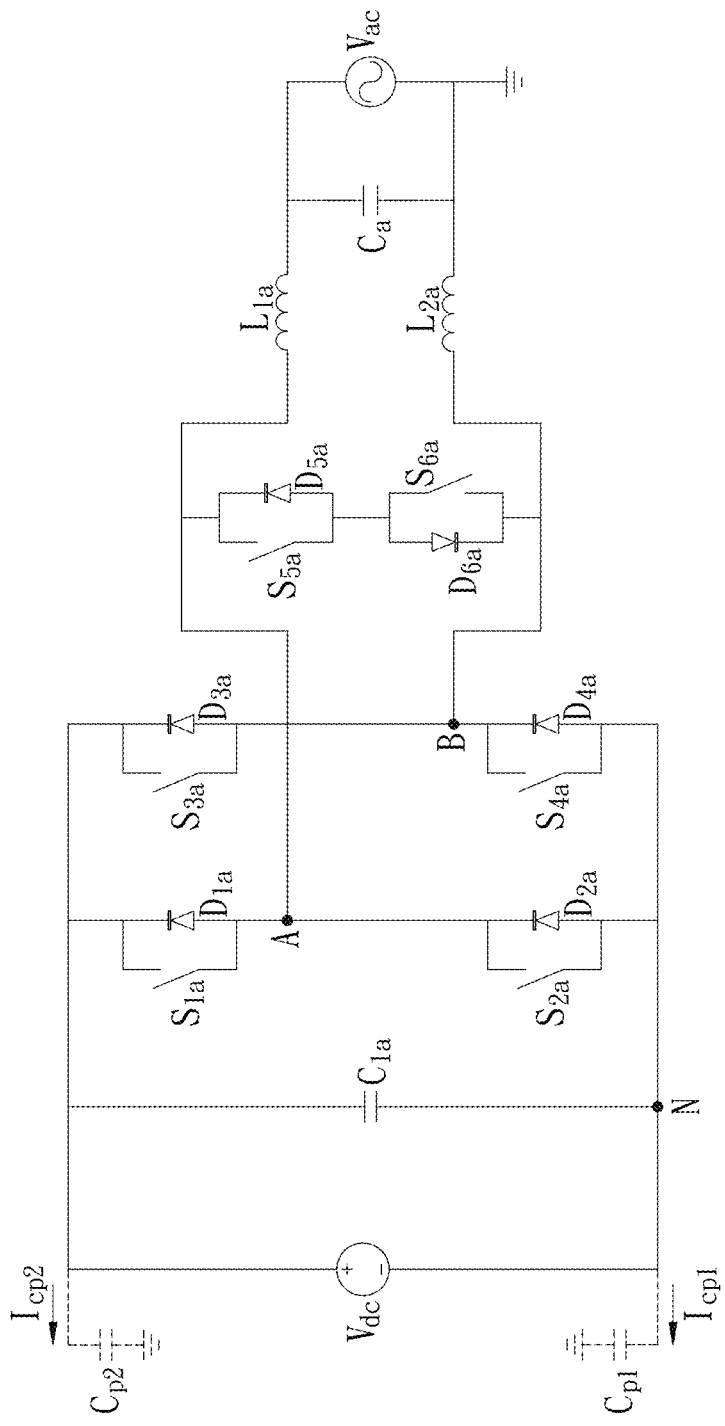
FIG. 1 is a circuit diagram of a prior art full-bridge inverter.

Reference will now be made to the drawing figures to describe the present disclosure in detail.

Figure 2:
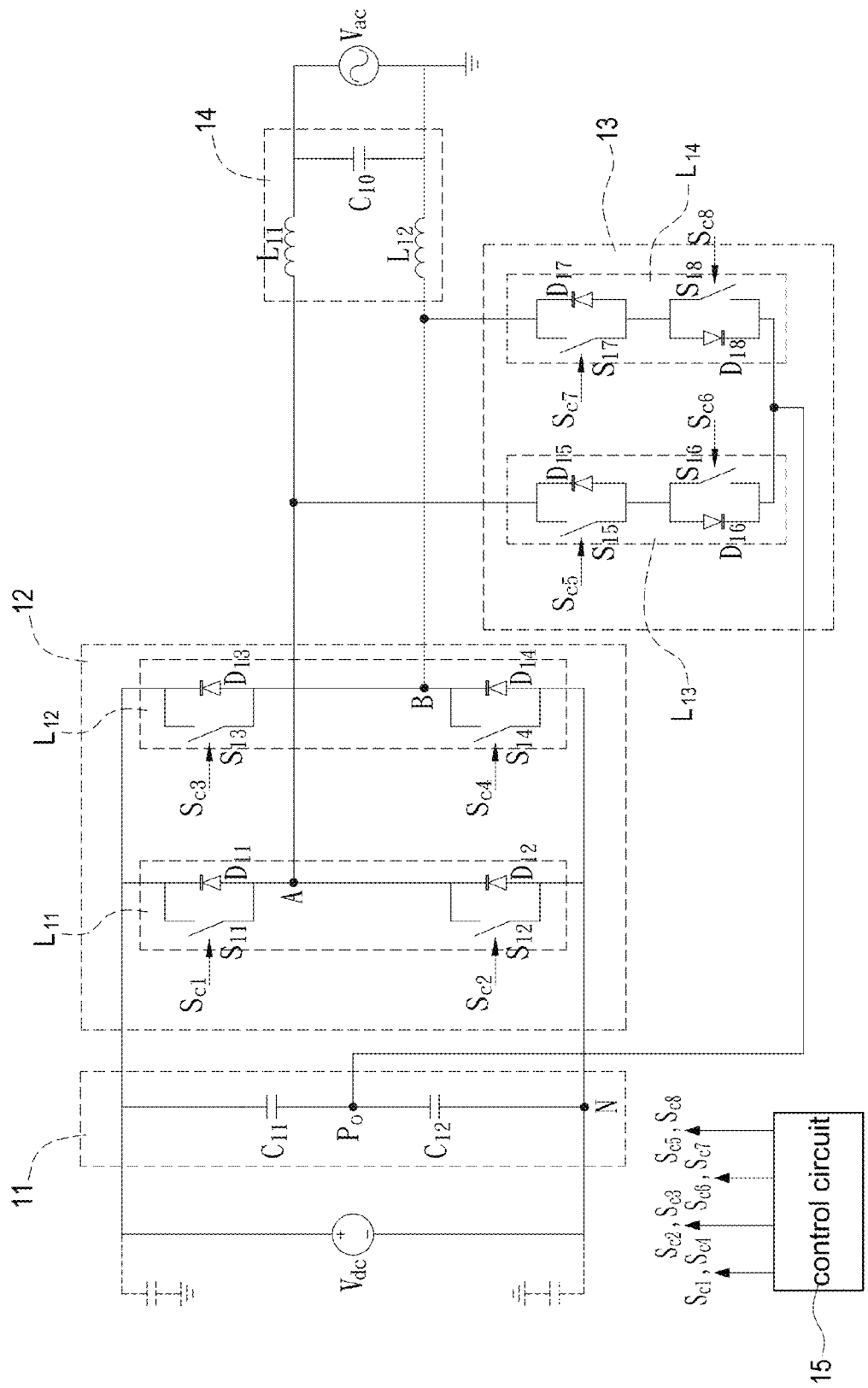
FIG. 2 is a circuit diagram of a DC-to-AC power conversion system according to a first embodiment of the present disclosure.

Reference is made to FIG. 2 which is a circuit diagram of a DC-to-AC power conversion system according to a first embodiment of the present disclosure. The DC-to-AC power conversion system is provided to convert a DC input voltage Vdc into an AC output voltage Vac. The DC-to-AC power conversion system includes an input capacitor set 11, a bridge switching circuit 12, an auxiliary switch circuit 13, a filter circuit 14, and a control circuit 15. The input capacitor set 11 receives the DC input voltage Vdc. The input capacitor set 11 has a first capacitor C11 and a second capacitor C12. The first capacitor C11 and the second capacitor C12 are connected to a neutral point Po to maintain a voltage across the first capacitor C11 and a voltage across the second capacitor C12 are equal to a half of the DC input voltage Vdc. The bridge switching circuit 12 is connected in parallel to the input capacitor set 11. The bridge switching circuit 12 has a first bridge arm L11 and a second bridge arm L12 connected in parallel to the first bridge arm L11. The first bridge arm L11 is composed of a first power switch S11 and a second power switch S12 connected in series to the first power switch S11. The second bridge arm L12 is composed of a third power switch S13 and a fourth power switch S14 connected in series to the third power switch S13. In this embodiment, the bridge switching circuit 12 is a full-bridge switching circuit. The auxiliary switch circuit 13 is connected between the neutral point Po and the bridge switching circuit 12. The auxiliary switch circuit 13 has a third bridge arm L13 and a fourth bridge arm L14 connected in parallel to the third bridge arm L13. The third bridge arm L13 is composed of a fifth power switch S15 and a sixth power switch S16 connected in series to the fifth power switch S15. The fourth bridge arm L14 is composed of a seventh power switch S17 and an eighth power switch S18 connected in series to the seventh power switch S17.

The filter circuit 14 is connected to the bridge switching circuit 12 and the auxiliary switch circuit 13. The filter circuit 14 has a first filter inductor L11, a second filter inductor L12, and a filter capacitor C10. The filter capacitor C10 is connected between the first filter inductor L11 and the second filter inductor L12. The first filter inductor L11 is connected to the first bridge arm L11 and the third bridge arm L13, and the second filter inductor L12 is connected to the second bridge arm L12 and the fourth bridge arm L14. The control circuit 15 produces a complementary switching signal pair Sc1, Sc4 and Sc2, Sc3 and a complementary level signal pair Sc6, Sc7 and Sc5, Sc8. The complementary switching signal pair Sc1, Sc4 and Sc2, Sc3 is provided to control the first and fourth power switches S11, S14 and the second and third power switches S12, S13, respectively. The complementary level signal pair Sc6, Sc7 and Sc5, Sc8 is provided to control the sixth and seventh power switches S16, S17 and the fifth and eighth power switches S15, S18, respectively. In addition, the first power switch S11, the second power switch S12, the third power switch S13, and the fourth power switch S14 of the bridge switching circuit 12 are connected in parallel to a diode, respectively, namely, a first diode D11, a second diode D12, a third diode D13, and a fourth diode D14. The fifth power switch S15, the sixth power switch S16, the seventh power switch S17, and the eighth power switch S18 of the auxiliary switch circuit 13 are connected in parallel to a diode, respectively, namely, a fifth diode D15, a sixth diode D16, a seventh diode D17, and an eighth diode D18. The detailed operation of the DC-to-AC power conversion system will be described hereinafter as follows.

Figure 3:
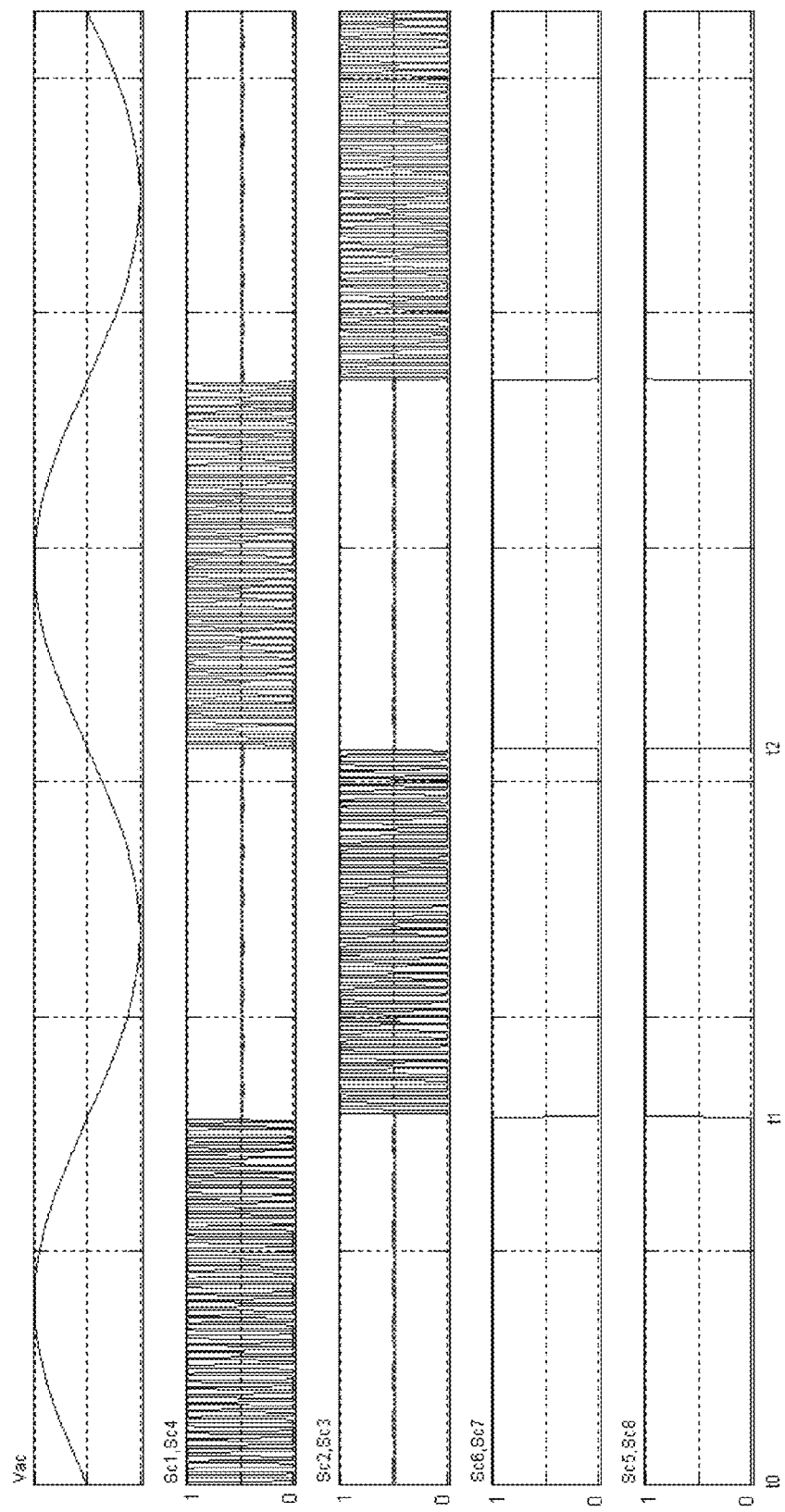
FIG. 3 is a waveform graph of switch control signals according to a first embodiment of the present disclosure.
Figure 4A:
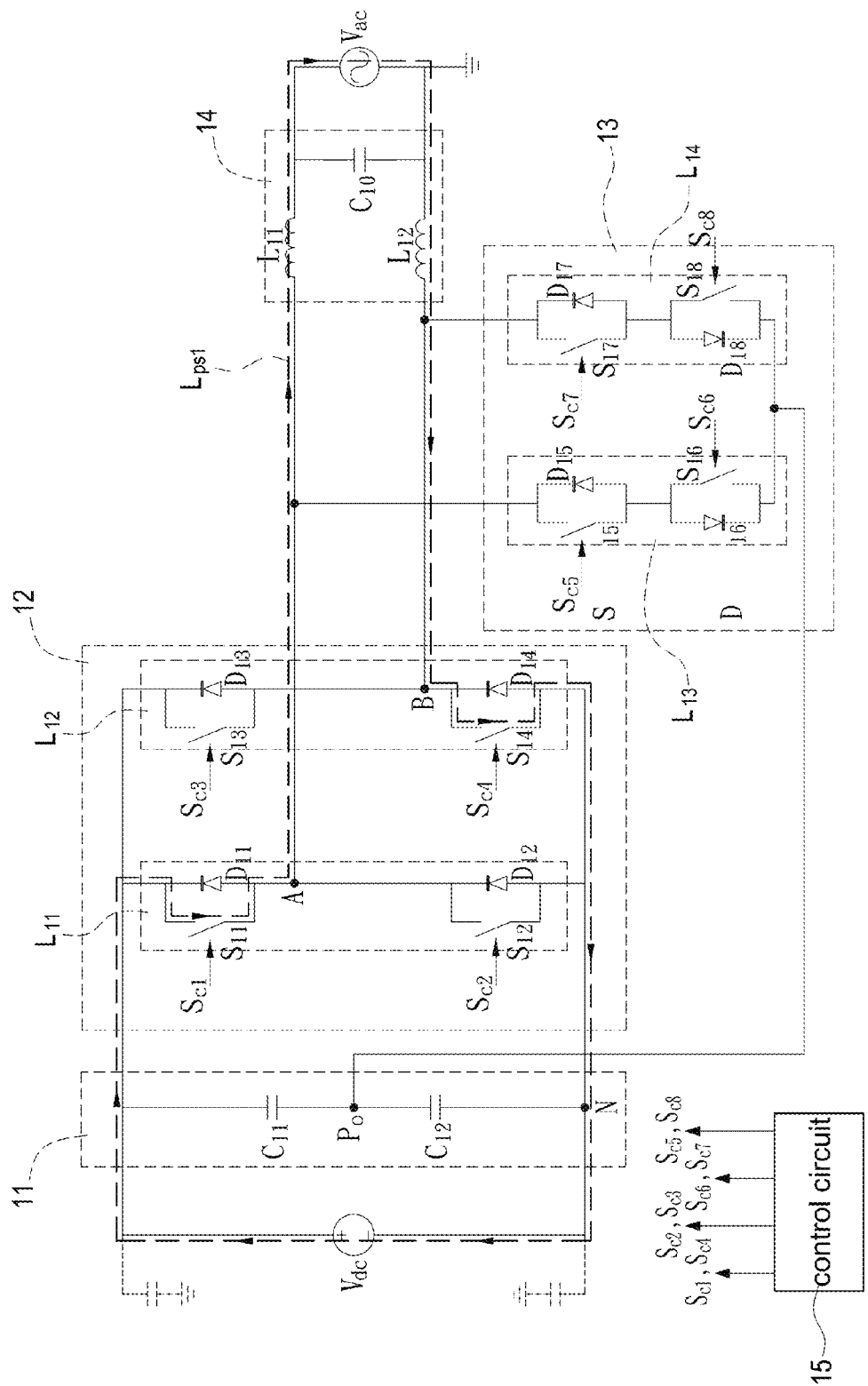
FIG. 4A is a circuit diagram of the DC-to-AC power conversion system under a positive half-cycle and energy-storing operation according to the first embodiment of the present disclosure.
Figure 4B:
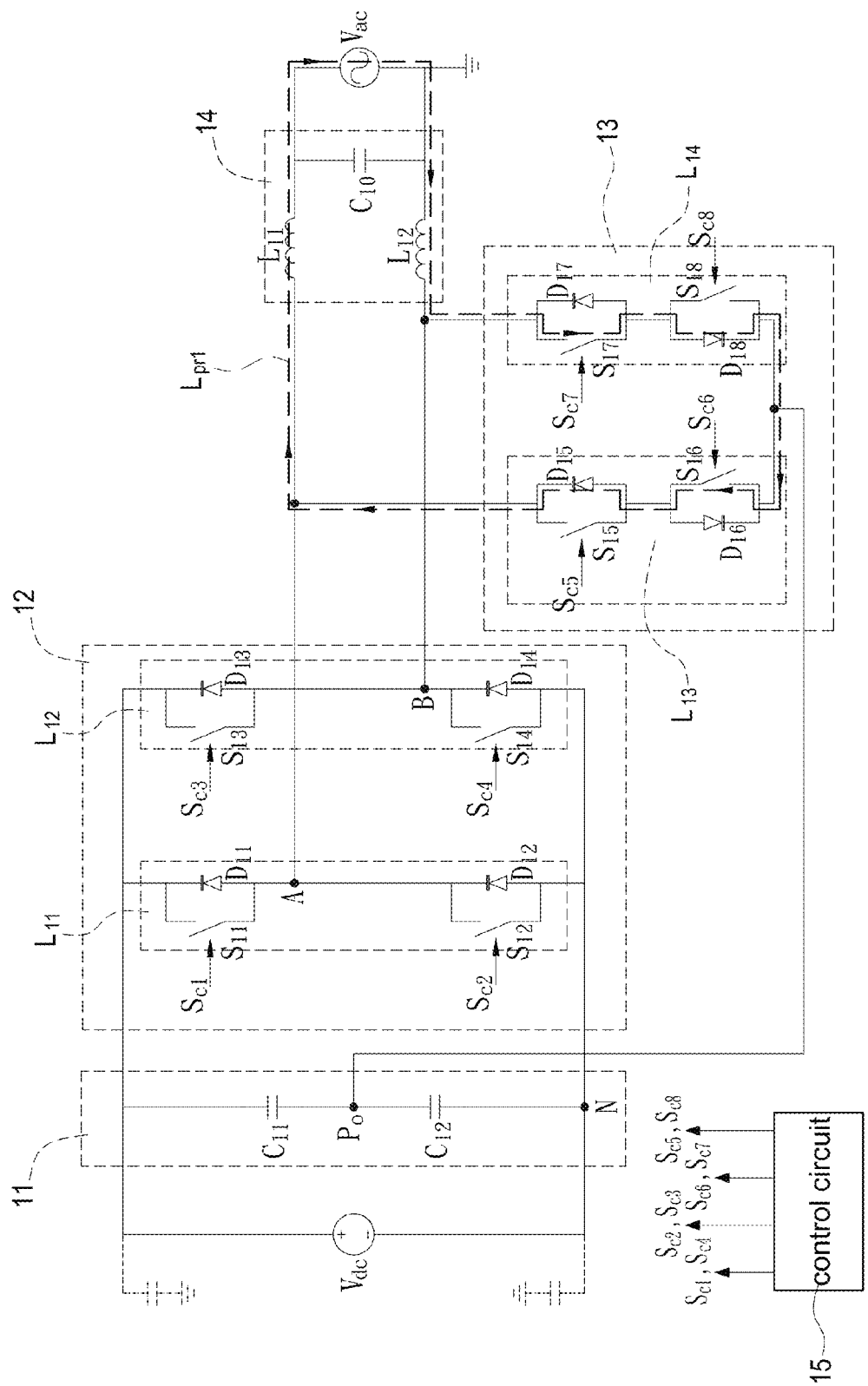
FIG. 4B is a circuit diagram of the DC-to-AC power conversion system under a positive half-cycle and energy-releasing operation according to the first embodiment of the present disclosure.

Reference is made to FIG. 4A and FIG. 4B which are circuit diagrams of the DC-to-AC power conversion system under a positive half-cycle energy-storing operation and a positive half-cycle energy-releasing operation, respectively, according to the first embodiment of the present disclosure. In addition, reference is made to FIG. 3 which is a waveform graph of switch control signals according to a first embodiment of the present disclosure. When the AC output voltage Vac is under the positive half-cycle operation (during a time interval between time t0 and time t1), the control circuit 15 produces the complementary switching signal pair Sc1, Sc4 and Sc2, Sc3 to switch the first power switch S11 and the fourth power switch S14 and turn off the second power switch S12 and the third power switch S13 at low level. Also, the control circuit 15 produces the complementary level signal pair Sc6, Sc7 and Sc5, Sc8 to turn on the sixth power switch S16 and the seventh power switch S17 at high level and turn off the fifth power switch S15 and the eighth power switch S18 at low level. As shown in FIG. 4A, when the first filter inductor L11 and the second filter inductor L12 are under the energy-storing operation through an energy-storing loop Lps1 sequentially formed by the DC input voltage Vdc, the first power switch S11, the first filter inductor L11, the AC output voltage Vac, the second filter inductor L12, the fourth power switch S14, and the DC input voltage Vdc. As shown in FIG. 4B, when the first filter inductor L11 and the second filter inductor L12 are under the energy-releasing operation through an energy-releasing loop Lpr1 sequentially formed by the first filter inductor L11, the AC output voltage Vac, the second filter inductor L12, the seventh power switch S17, the eighth diode D18, the sixth power switch S16, the fifth diode D15, and the first filter inductor L11.

Figure 5A:
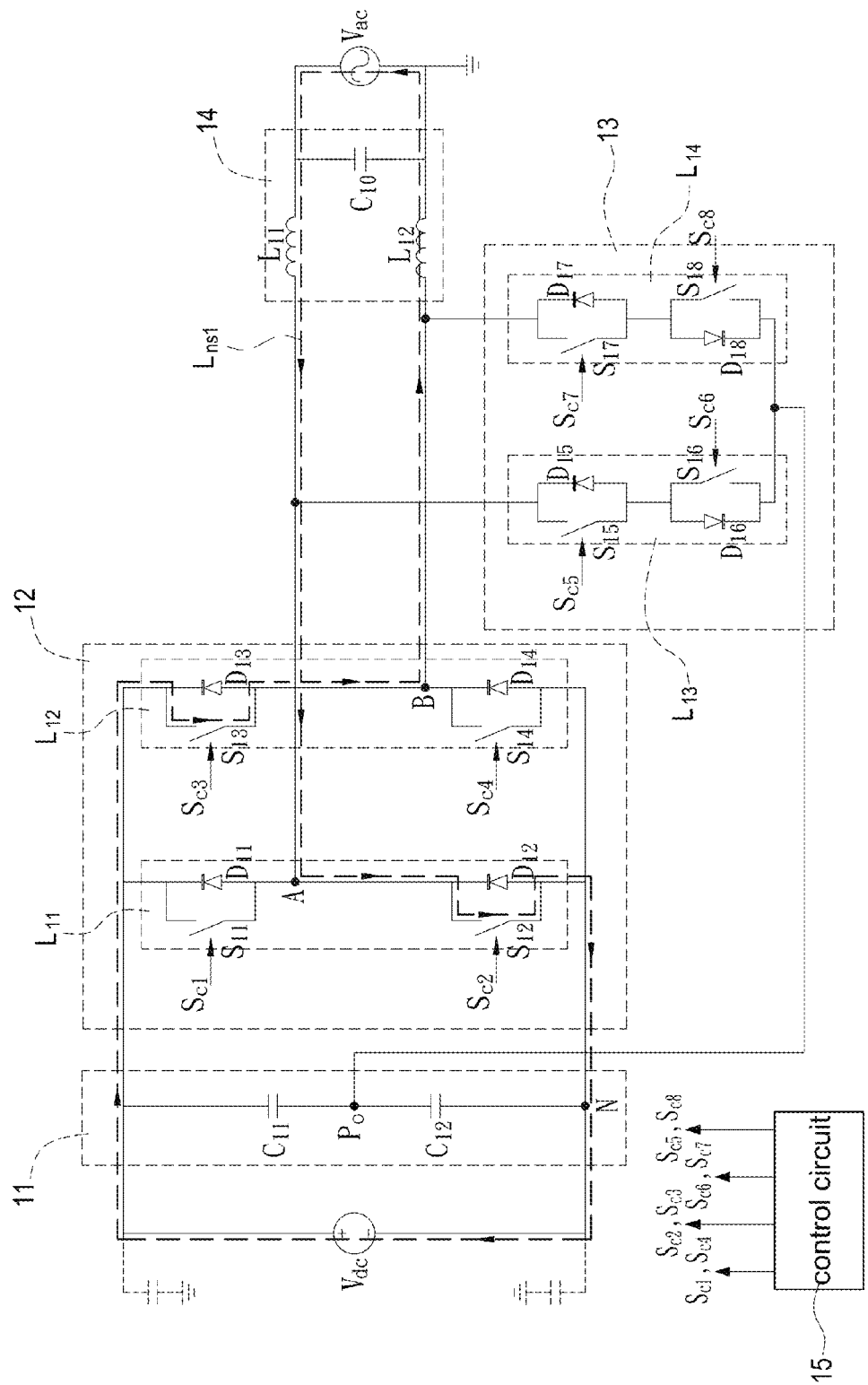
FIG. 5A is a circuit diagram of the DC-to-AC power conversion system under a negative half-cycle and energy-storing operation according to the first embodiment of the present disclosure.
Figure 5B:
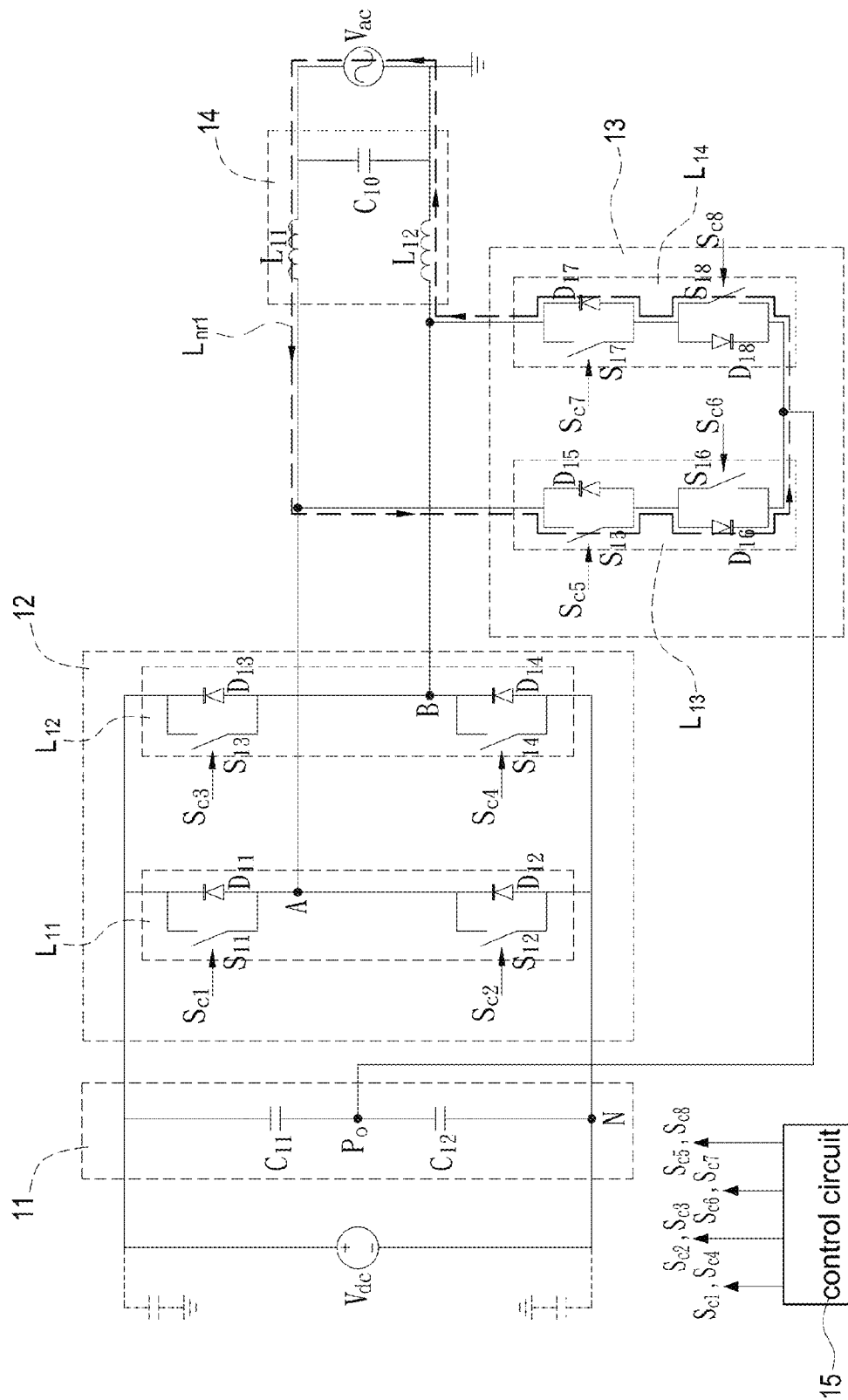
FIG. 5B is a circuit diagram of the DC-to-AC power conversion system under a negative half-cycle and energy-releasing operation according to the first embodiment of the present disclosure.

Reference is made to FIG. 5A and FIG. 5B which are circuit diagrams of the DC-to-AC power conversion system under a negative half-cycle energy-storing operation and a negative half-cycle energy-releasing operation, respectively, according to the first embodiment of the present disclosure. When the AC output voltage Vac is under the negative half-cycle operation (during a time interval between time t1 and time t2), the control circuit 15 produces the complementary switching signal pair Sc2, Sc3 and Sc1, Sc4 to switch the second power switch S12 and the third power switch S13 and turn off the first power switch S11 and the fourth power switch S14 at low level. Also, the control circuit 15 produces the complementary level signal pair Sc5, Sc8 and Sc6, Sc7 to turn on the fifth power switch S15 and the eighth power switch S18 at high level and turn off the sixth power switch S16 and the seventh power switch S17 at low level. As shown in FIG. 5A, when the first filter inductor L11 and the second filter inductor L12 are under the energy-storing operation through an energy-storing loop Lns1 sequentially formed by the DC input voltage Vdc, the third power switch S13, the second filter inductor L12, the AC output voltage Vac, the first filter inductor L11, the second power switch S12, and the DC input voltage Vdc. As shown in FIG. 5B, when the first filter inductor L11 and the second filter inductor L12 are under the energy-releasing operation through an energy-releasing loop Lnr1 sequentially formed by the second filter inductor L12, the AC output voltage Vac, the first filter inductor L11, the fifth power switch S15, the sixth diode D16, the eighth power switch S18, the seventh diode D17, and the second filter inductor L12.

Figure 6:
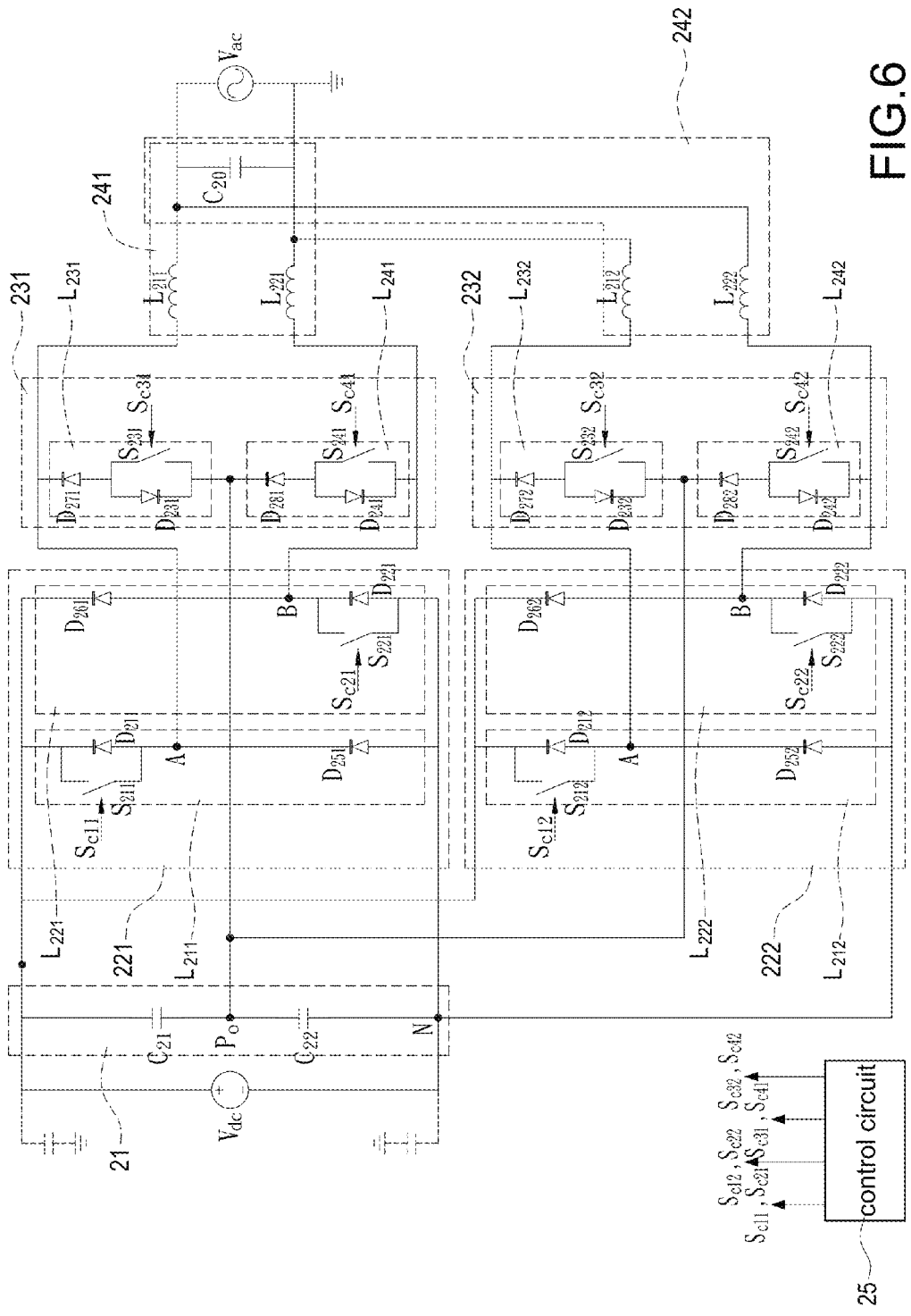
FIG. 6 is a circuit diagram of a DC-to-AC power conversion system according to a second embodiment of the present disclosure.

Reference is made to FIG. 6 which is a circuit diagram of a DC-to-AC power conversion system according to a second embodiment of the present disclosure. The DC-to-AC power conversion system is provided to convert a DC input voltage Vdc into an AC output voltage Vac. The DC-to-AC power conversion system includes an input capacitor set 21, a first bridge switching circuit 221, a first auxiliary switch circuit 231, a second bridge switching circuit 222, a second auxiliary switch circuit 232, a first filter circuit 241, a second filter circuit 242, and a control circuit 25. The input capacitor set 21 receives the DC input voltage Vdc. The input capacitor set 21 has a first capacitor C21 and a second capacitor C22. The first capacitor C21 and the second capacitor C22 are connected to a neutral point Po to maintain a voltage across the first capacitor C11 and a voltage across the second capacitor C12 are equal to a half of the DC input voltage Vdc. The first bridge switching circuit 221 is connected in parallel to the input capacitor set 21. The first bridge switching circuit 221 has a first bridge arm L211 and a second bridge arm L221 connected in parallel to the first bridge arm L211. The first bridge arm L211 is composed of a first power switch S211 and a fifth diode D251 connected in series to the first power switch S211. The second bridge arm L221 is composed of a second power switch S221 and a sixth diode D261 connected in series to the second power switch S221. The first auxiliary switch circuit 231 is connected between the neutral point Po and the first bridge switching circuit 221. The first auxiliary switch circuit 231 has a third bridge arm L231 and a fourth bridge arm L241 connected in parallel to the third bridge arm L231. The third bridge arm L231 is composed of a third power switch S231 and a seventh diode D271 connected in series to the third power switch S231. The fourth bridge arm L241 is composed of a fourth power switch S241 and an eighth diode D281 connected in series to the fourth power switch S241.

The second bridge switching circuit 222 is connected in parallel to the input capacitor set 21. The second bridge switching circuit 222 has a first bridge arm L212 and a second bridge arm L222 connected in parallel to the first bridge arm L212. The first bridge arm L212 is composed of a first power switch S212 and a fifth diode D252 connected in series to the first power switch S212. The second bridge arm L222 is composed of a second power switch S222 and a sixth diode D262 connected in series to the second power switch S222. The second auxiliary switch circuit 232 is connected between the neutral point Po and the second bridge switching circuit 222. The second auxiliary switch circuit 232 has a third bridge arm L232 and a fourth bridge arm L242 connected in parallel to the third bridge arm L232. The third bridge arm L232 is composed of a third power switch S232 and a seventh diode D272 connected in series to the third power switch S232. The fourth bridge arm L242 is composed of a fourth power switch S242 and an eighth diode D282 connected in series to the fourth power switch S242.

The first filter circuit 241 is connected to the first bridge switching circuit 221 and the first auxiliary switch circuit 231. The first filter circuit 241 has a first filter inductor L211, a second filter inductor L221, and a filter capacitor C20. The second filter circuit 242 is connected to the second bridge switching circuit 222 and the second auxiliary switch circuit 232. The second filter circuit 242 has a first filter inductor L212, a second filter inductor L222, and the filter capacitor C20. The control circuit 25 produces a complementary switching signal pair Sc11, Sc21 and Sc12, Sc22 and a complementary level signal pair Sc31, Sc41 and Sc32, Sc42. The complementary switching signal pair Sc11, Sc21 and Sc12, Sc22 is provided to control the first and second power switches S211, S221 of the first bridge switching circuit 221 and the first and second power switches S212, S222 of the second bridge switching circuit 222, respectively. The complementary level signal pair Sc31, Sc41 and Sc32, Sc42 is provided to control the third and fourth power switches S231, S241 of the first auxiliary switch circuit 231 and the third and fourth power switches S232, S242 of the second auxiliary switch circuit 232, respectively. In addition, the first power switch S211 and the second power switch S221 of the first bridge switching circuit 221 are connected in parallel to a diode, respectively, namely, a first diode D211 and a second diode D221. The third power switch S231 and the fourth power switch S241 of the first auxiliary switch circuit 231 are connected in parallel to a diode, respectively, namely, a third diode D231 and a fourth diode D241. The first power switch S212 and the second power switch S222 of the second bridge switching circuit 222 are connected in parallel to a diode, respectively, namely, a first diode D212 and a second diode D222. The third power switch S232 and the fourth power switch S242 of the second auxiliary switch circuit 232 are connected in parallel to a diode, respectively, namely, a third diode D232 and a fourth diode D242. The detailed operation of the DC-to-AC power conversion system will be described hereinafter as follows.

Figure 7:
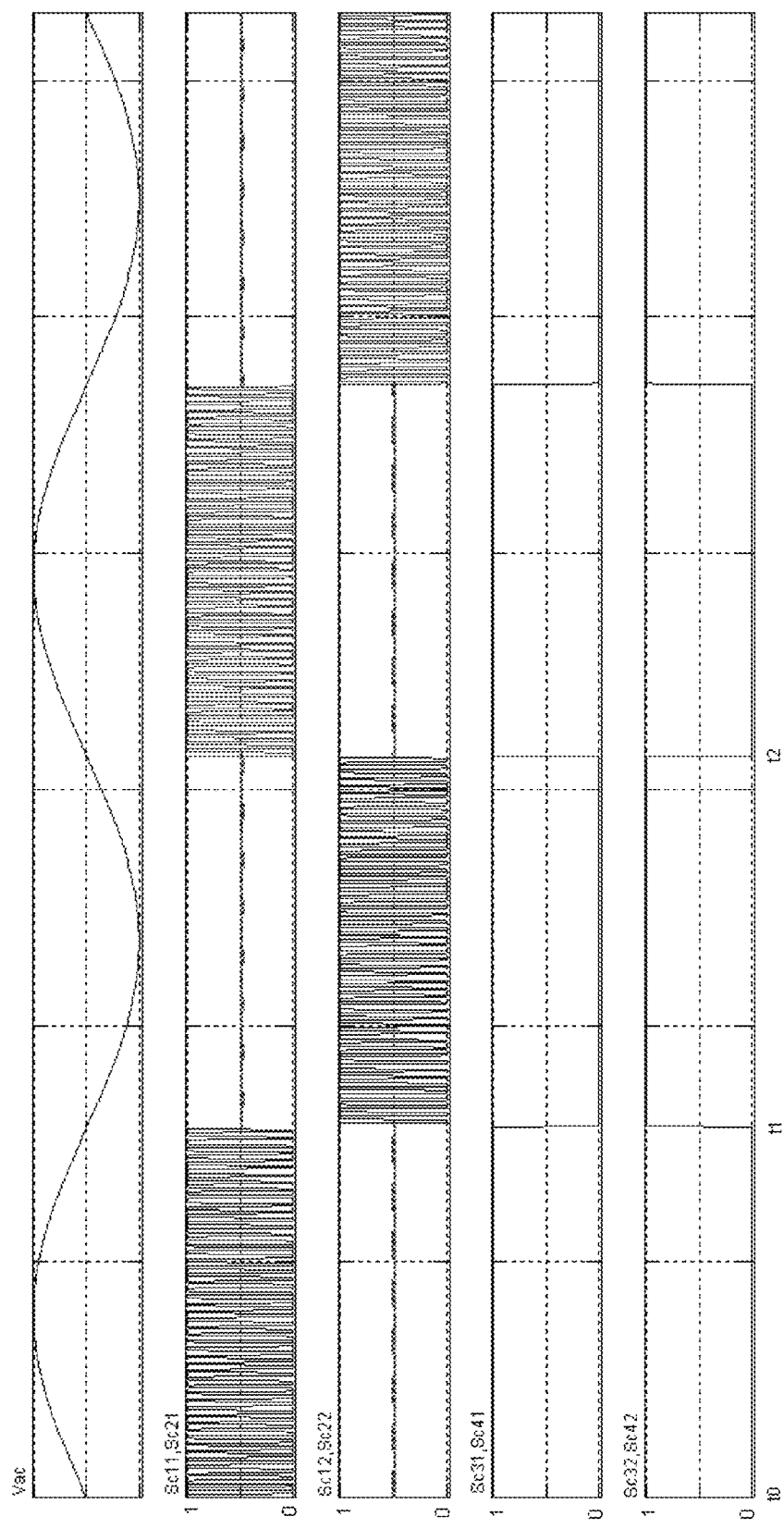
FIG. 7 is a waveform graph of switch control signals according to a second embodiment of the present disclosure.
Figure 8A:
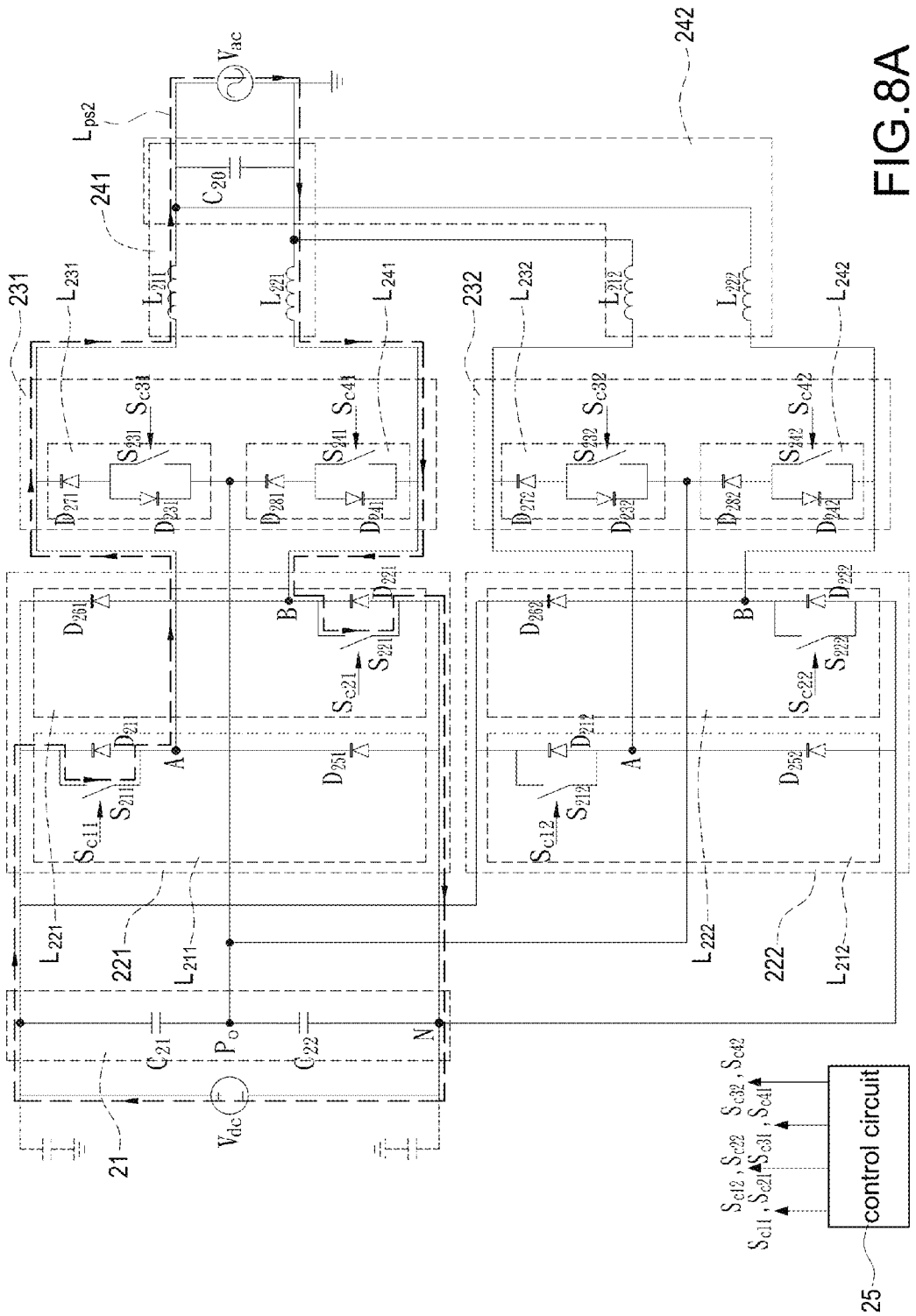
FIG. 8A is a circuit diagram of the DC-to-AC power conversion system under a positive half-cycle and energy-storing operation according to the second embodiment of the present disclosure.
Figure 8B:
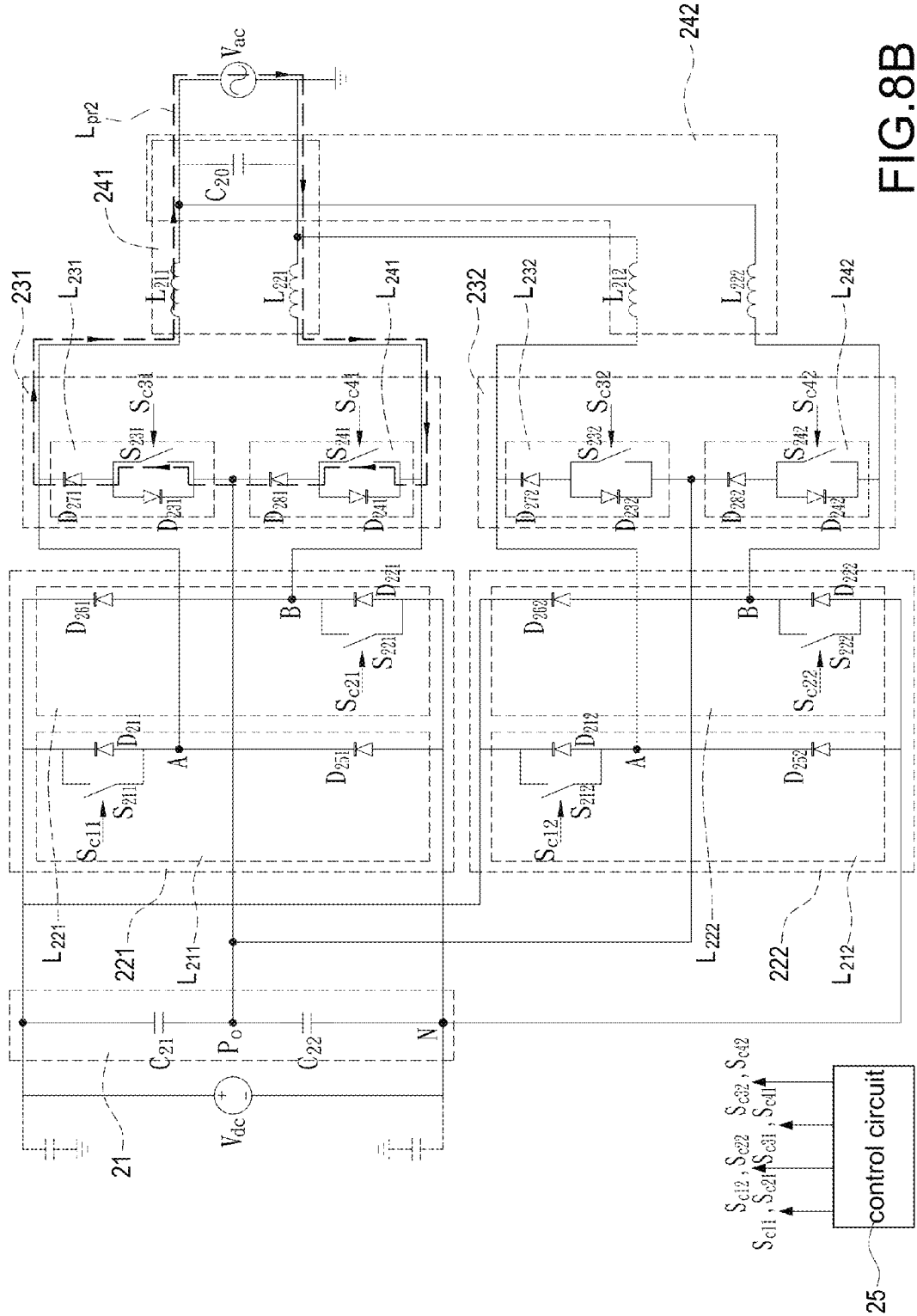
FIG. 8B is a circuit diagram of the DC-to-AC power conversion system under a positive half-cycle and energy-releasing operation according to the second embodiment of the present disclosure.

Reference is made to FIG. 8A and FIG. 8B which are circuit diagrams of the DC-to-AC power conversion system under a positive half-cycle energy-storing operation and a positive half-cycle energy-releasing operation, respectively, according to the second embodiment of the present disclosure. In addition, reference is made to FIG. 7 which is a waveform graph of switch control signals according to a second embodiment of the present disclosure. When the AC output voltage Vac is under the positive half-cycle operation (during a time interval between time t0 and time t1), the control circuit 25 produces the complementary switching signal pair Sc11, Sc21 and Sc12, Sc22 to switch the first power switch S211 and the second power switch S221 of the first bridge switching circuit 221 and turn off the first power switch S212 and the second power switch S222 of the second bridge switching circuit 222 at low level. Also, the control circuit 25 produces the complementary level signal pair Sc31, Sc41 and Sc32, Sc42 to turn on the third power switch S231 and the fourth power switch S241 of the first auxiliary switch circuit 231 at high level and turn off the third power switch S232 and the fourth power switch S242 of the second auxiliary switch circuit 232 at low level. As shown in FIG. 8A, when the first filter inductor L211 and the second filter inductor L221 are under the energy-storing operation through an energy-storing loop Lps2 sequentially formed by the DC input voltage Vdc, the first power switch S211, the first filter inductor L211, the AC output voltage Vac, the second filter inductor L221, the second power switch S221, and the DC input voltage Vdc. As shown in FIG. 8B, when the first filter inductor L211 and the second filter inductor L221 are under the energy-releasing operation through an energy-releasing loop Lpr2 sequentially formed by the first filter inductor L211, the AC output voltage Vac, the second filter inductor L221, the fourth power switch S241, the eighth diode D281, the third power switch S231, the seventh diode D271, and the first filter inductor L211.

Figure 9A:
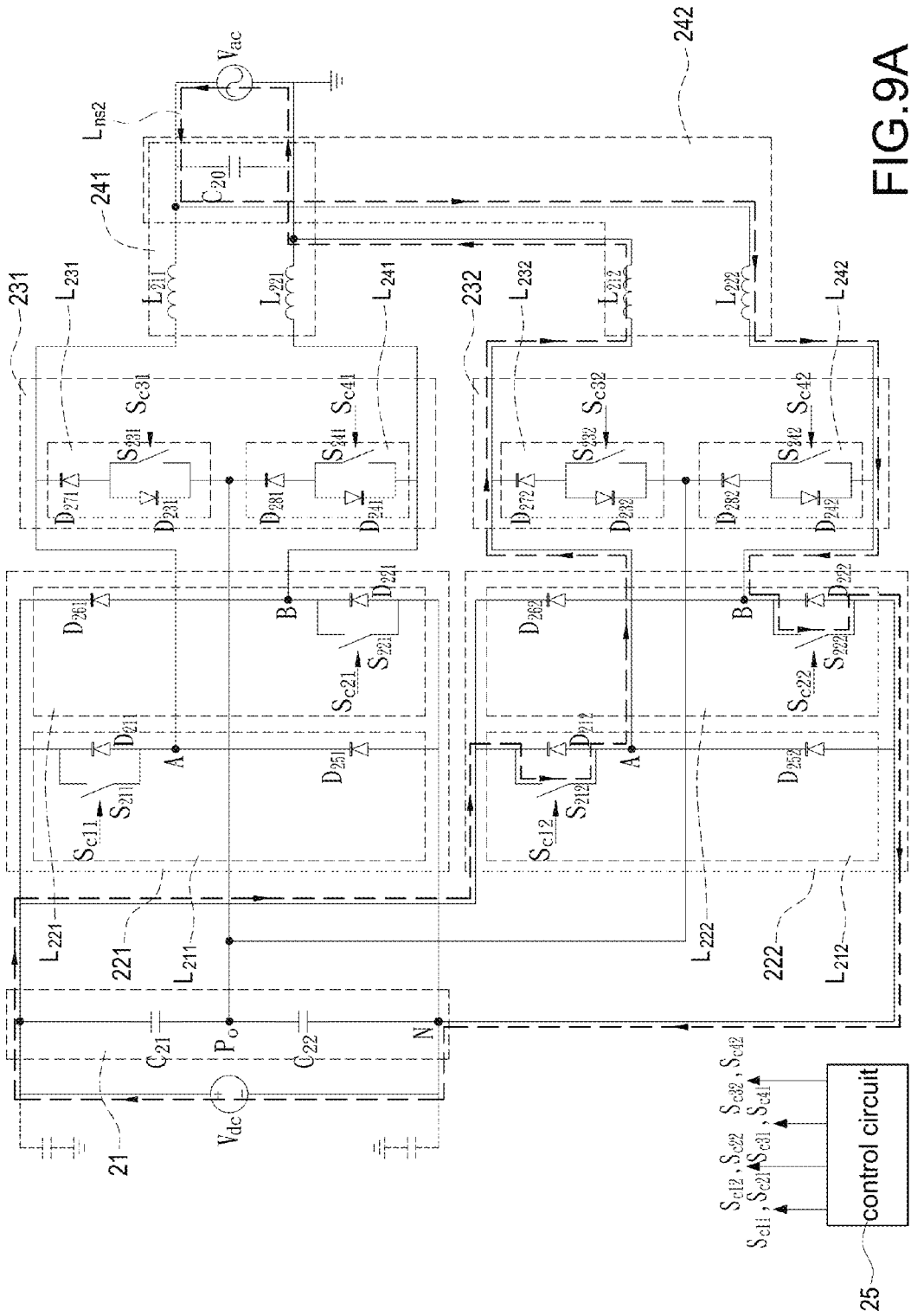
FIG. 9A is a circuit diagram of the DC-to-AC power conversion system under a negative half-cycle and energy-storing operation according to the second embodiment of the present disclosure.
Figure 9B:
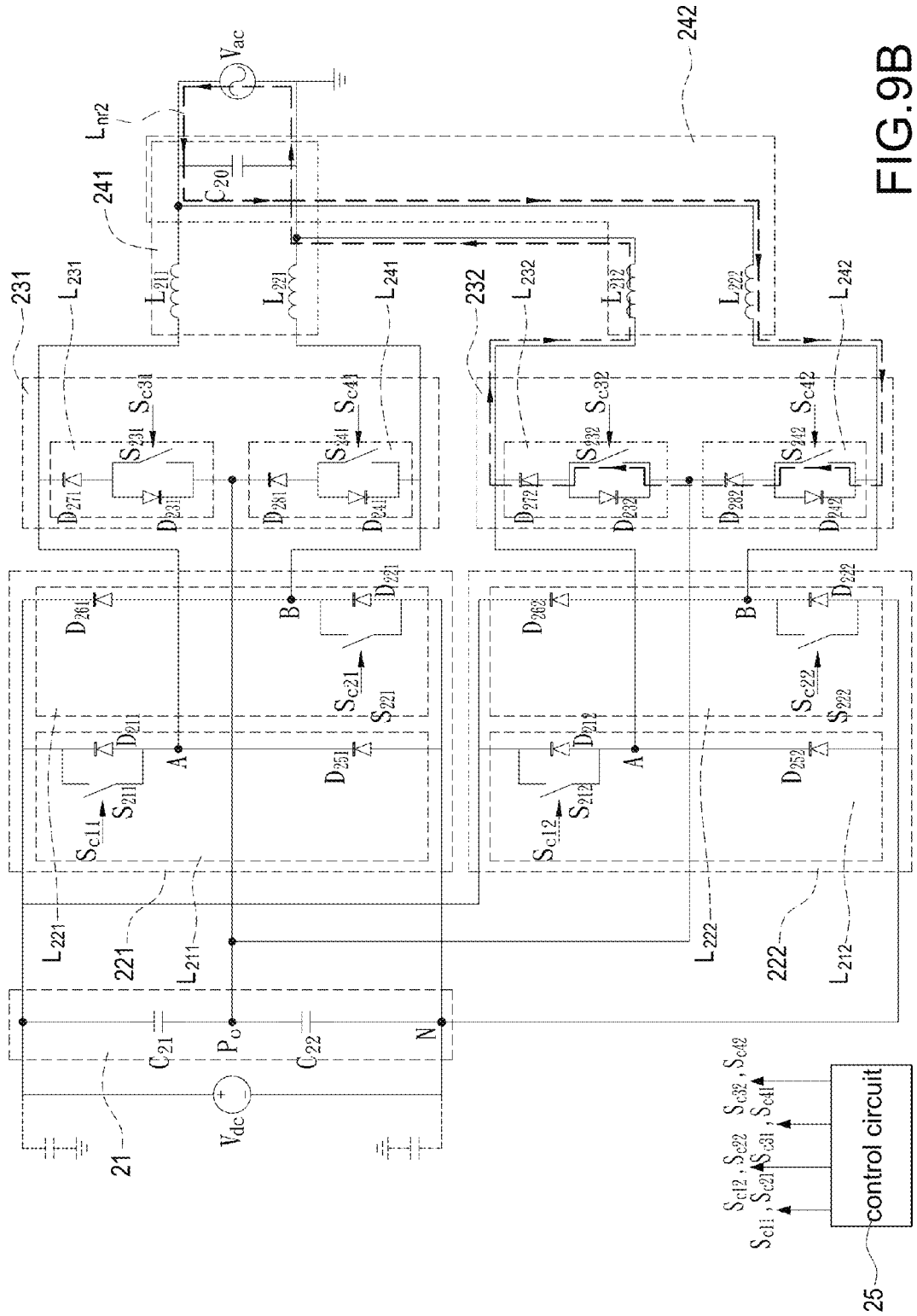
FIG. 9B is a circuit diagram of the DC-to-AC power conversion system under a negative half-cycle and energy-releasing operation according to the second embodiment of the present disclosure.

Reference is made to FIG. 9A and FIG. 9B which are circuit diagrams of the DC-to-AC power conversion system under a negative half-cycle energy-storing operation and a negative half-cycle energy-releasing operation, respectively, according to the second embodiment of the present disclosure. When the AC output voltage Vac is under the negative half-cycle operation (during a time interval between time t1 and time t2), the control circuit 25 produces the complementary switching signal pair Sc12, Sc22 and Sc11, Sc21 to switch the first power switch S212 and the second power switch S222 of the second bridge switching circuit 222 and turn off the first power switch S211 and the second power switch S221 of the first bridge switching circuit 221 at low level. Also, the control circuit 25 produces the complementary level signal pair Sc32, Sc42 and Sc31, Sc41 to turn on the third power switch S232 and the fourth power switch S242 of the second auxiliary switch circuit 232 at high level and turn off the third power switch S231 and the fourth power switch S241 of the first auxiliary switch circuit 231 at low level. As shown in FIG. 9A, when the first filter inductor L212 and the second filter inductor L222 are under the energy-storing operation through an energy-storing loop Lns2 sequentially formed by the DC input voltage Vdc, the first power switch S212, the first filter inductor L212, the AC output voltage Vac, the second filter inductor L222, the second power switch S222, and the DC input voltage Vdc. As shown in FIG. 9B, when the first filter inductor L212 and the second filter inductor L222 are under the energy-releasing operation through an energy-releasing loop Lnr2 sequentially formed by the first filter inductor L212, the AC output voltage Vac, the second filter inductor L222, the fourth power switch S242, the eighth diode D282, the third power switch S232, the seventh diode D272, and the first filter inductor L212.

Figure 10:
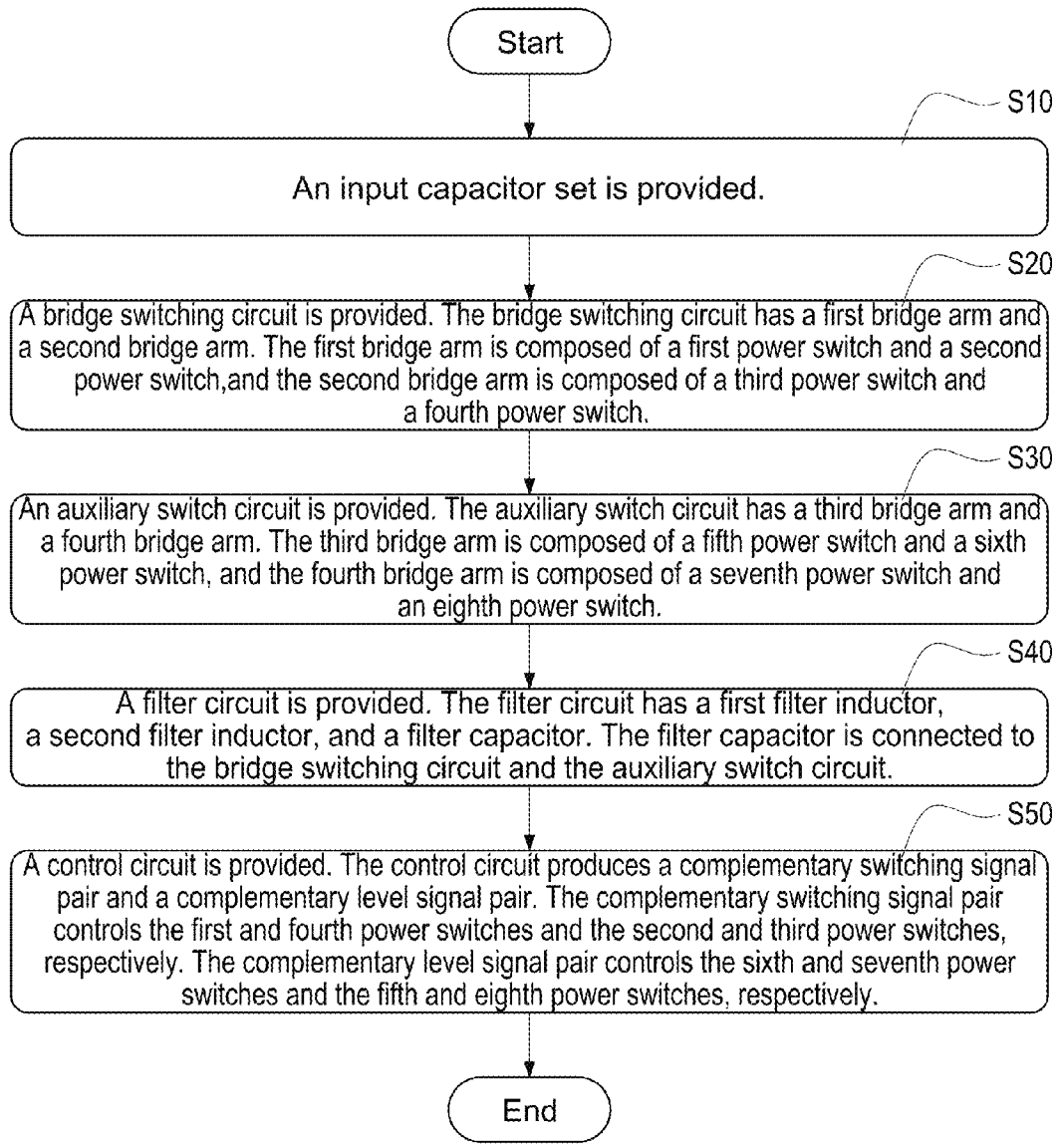
FIG. 10 is a flowchart of a method of operating a DC-to-AC power conversion system according to the present disclosure.

Reference is made to FIG. 10 which is a flowchart of a method of operating a DC-to-AC power conversion system according to the present disclosure. The DC-to-AC power conversion system converts a DC input voltage into an AC output voltage and the method includes following steps. First, an input capacitor set is provided (S10). The input capacitor set has a first capacitor and a second capacitor, and the first capacitor and the second capacitor are connected to a neutral point and configured to receive the DC input voltage so as to maintain a voltage across the first capacitor and a voltage across the second capacitor are equal to a half of the DC input voltage. Afterward, a bridge switching circuit is provided (S20). The bridge switching circuit is connected in parallel to the input capacitor set, and the bridge switching circuit has a first bridge arm and a second bridge arm connected in parallel to the first bridge arm. The first bridge arm is composed of a first power switch and a second power switch connected in series to the first power switch, and the second bridge arm is composed of a third power switch and a fourth power switch connected in series to the third power switch. In particular, the first power switch, the second power switch, the third power switch, and the fourth power switch of the bridge switching circuit are connected in parallel to a diode, respectively, namely, a first diode, a second diode, a third diode, and a fourth diode.

Afterward, an auxiliary switch circuit is provided (S30). The auxiliary switch circuit is connected between the neutral point and the bridge switching circuit, and the auxiliary switch circuit has a third bridge arm and a fourth bridge arm connected in parallel to the third bridge arm. The third bridge arm is composed of a fifth power switch and a sixth power switch connected in series to the fifth power switch, and the fourth bridge arm is composed of a seventh power switch and an eighth power switch connected in series to the seventh power switch. In particular, the fifth power switch, the sixth power switch, the seventh power switch, and the eighth power switch of the auxiliary switch circuit are connected in parallel to a diode, respectively, namely, a fifth diode, a sixth diode, a seventh diode, and an eighth diode. Afterward, a filter circuit is provided (S40). The filter circuit has a first filter inductor, a second filter inductor, and a filter capacitor. The filter capacitor is connected between the first filter inductor and the second filter inductor, the first filter inductor is connected to the first bridge arm and the third bridge arm, and the second filter inductor is connected to the second bridge arm and the fourth bridge arm. Afterward, a control circuit is provided (S50). The control circuit is configured to produce a complementary switching signal pair and a complementary level signal pair. The complementary switching signal pair is configured to control the first and fourth power switches and the second and third power switches, respectively. The complementary level signal pair is configured to control the sixth and seventh power switches and the fifth and eighth power switches, respectively.

When the AC output voltage is under the positive half-cycle operation, the control circuit is configured to produce the complementary switching signal pair to switch the first power switch and the fourth power switch and turn off the second power switch and the third power switch at low level. The control circuit is configured to produce the complementary level signal pair to turn on the sixth power switch and the seventh power switch at high level and turn off the fifth power switch and the eighth power switch at low level. When the first filter inductor and the second filter inductor are under the energy-storing operation, an energy-storing loop is sequentially formed by the DC input voltage, the first power switch, the first filter inductor, the AC output voltage, the second filter inductor, the fourth power switch, and the DC input voltage.

When the AC output voltage is under the positive half-cycle operation, the control circuit is configured to produce the complementary switching signal pair to switch the first power switch and the fourth power switch and turn off the second power switch and the third power switch at low level. The control circuit is configured to produce the complementary level signal pair to turn on the sixth power switch and the seventh power switch at high level and turn off the fifth power switch and the eighth power switch at low level. When the first filter inductor and the second filter inductor are under the energy-releasing operation, an energy-releasing loop is sequentially formed by the first filter inductor, the AC output voltage, the second filter inductor, the seventh power switch, the eighth diode, the sixth power switch, the fifth diode, and the first filter inductor.

When the AC output voltage is under the negative half-cycle operation, the control circuit is configured to produce the complementary switching signal pair to switch the second power switch and the third power switch and turn off the first power switch and the fourth power switch at low level. The control circuit is configured to produce the complementary level signal pair to turn on the fifth power switch and the eighth power switch at high level and turn off the sixth power switch and the seventh power switch at low level. When the first filter inductor and the second filter inductor are under the energy-storing operation, an energy-storing loop is sequentially formed by the DC input voltage, the third power switch, the second filter inductor, the AC output voltage, the first filter inductor, the second power switch, and the DC input voltage.

When the AC output voltage is under the negative half-cycle operation, the control circuit is configured to produce the complementary switching signal pair to switch the second power switch and the third power switch and turn off the first power switch and the fourth power switch at low level. The control circuit is configured to produce the complementary level signal pair to turn on the fifth power switch and the eighth power switch at high level and turn off the sixth power switch and the seventh power switch at low level. When the first filter inductor and the second filter inductor are under the energy-releasing operation, an energy-releasing loop is sequentially formed by the second filter inductor, the AC output voltage, the first filter inductor, the fifth power switch, the sixth diode, the eighth power switch, the seventh diode, and the second filter inductor.

In conclusion, the present disclosure has following advantages:

1. The auxiliary switch circuit is used to provide the energy-releasing loops. Also, the auxiliary switch circuit is connected to the neutral point so that the first capacitor and the second capacitor are used to limit the $V_{AN}$ and $V_{BN}$ are equal to a half of the DC input voltage under the zero voltage condition. Accordingly, the common mode voltage of the point A and the point B is fixed to significantly reduce leakage currents caused by parasitic capacitance voltages.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A DC-to-AC power conversion system converting a DC input voltage into an AC output voltage, the DC-to-AC power conversion system comprising:

an input capacitor set having a first capacitor and a second capacitor, and the first capacitor and the second capacitor connected to a neutral point and configured to receive the DC input voltage;

a bridge switching circuit connected in parallel to the input capacitor set, and the bridge switching circuit having a first bridge arm and a second bridge arm connected in parallel to the first bridge arm; wherein the first bridge arm is composed of a first power switch and a second power switch connected in series to the first power switch, and the second bridge arm is composed of a third power switch and a fourth power switch connected in series to the third power switch;

an auxiliary switch circuit connected between the neutral point and the bridge switching circuit, and the auxiliary switch circuit having a third bridge arm and a fourth bridge arm connected in parallel to the third bridge arm; wherein the third bridge arm is composed of a fifth power switch and a sixth power switch connected in series to the fifth power switch, and the fourth bridge arm is composed of a seventh power switch and an eighth power switch connected in series to the seventh power switch;

a filter circuit having a first filter inductor, a second filter inductor, and a filter capacitor; wherein the filter capacitor is connected between the first filter inductor and the second filter inductor, the first filter inductor is connected to the first bridge arm and the third bridge arm, and the second filter inductor is connected to the second bridge arm and the fourth bridge arm; and a control circuit configured to produce a complementary switching signal pair and a complementary level signal pair; wherein the complementary switching signal pair is configured to control the first and fourth power switches and the second and third power switches, respectively; the complementary level signal pair is configured to control the sixth and seventh power switches and the fifth and eighth power switches, respectively; wherein the auxiliary switch circuit is configured to provide the energy-releasing loops of the first filter inductor and the second filter inductor to reduce leakage currents of the DC input voltage caused by parasitic capacitance voltages.

2. The DC-to-AC power conversion system in claim 1, wherein the first power switch, the second power switch, the third power switch, and the fourth power switch of the bridge switching circuit are connected in parallel to a first diode, a second diode, a third diode, and a fourth diode, respectively; the fifth power switch, the sixth power switch, the seventh power switch, and the eighth power switch of the auxiliary switch circuit are connected in parallel to a fifth diode, a sixth diode, a seventh diode, and an eighth diode, respectively.

3. The DC-to-AC power conversion system in claim 2, wherein when the AC output voltage is under the positive half-cycle operation, the control circuit is configured to produce the complementary switching signal pair to switch the first power switch and the fourth power switch and turn off the second power switch and the third power switch at low level; and the control circuit is configured to produce the complementary level signal pair to turn on the sixth power switch and the seventh power switch at high level and turn off the fifth power switch and the eighth power switch at low level; when the first filter inductor and the second filter inductor are under the energy-storing operation, an energy-storing loop is sequentially formed by the DC input voltage, the first power switch, the first filter inductor, the AC output voltage, the second filter inductor, the fourth power switch, and the DC input voltage.

4. The DC-to-AC power conversion system in claim 2, wherein when the AC output voltage is under the positive half-cycle operation, the control circuit is configured to produce the complementary switching signal pair to switch the first power switch and the fourth power switch and turn off the second power switch and the third power switch at low level; and the control circuit is configured to produce the complementary level signal pair to turn on the sixth power switch and the seventh power switch at high level and turn off the fifth power switch and the eighth power switch at low level; when the first filter inductor and the second filter inductor are under the energy-releasing operation, an energy-releasing loop is sequentially formed by the first filter inductor, the AC output voltage, the second filter inductor, the seventh power switch, the eighth diode, the sixth power switch, the fifth diode, and the first filter inductor.

5. The DC-to-AC power conversion system in claim 2, wherein when the AC output voltage is under the negative half-cycle operation, the control circuit is configured to produce the complementary switching signal pair to switch the second power switch and the third power switch and turn off the first power switch and the fourth power switch at low level; and the control circuit is configured to produce the complementary level signal pair to turn on the fifth power switch and the eighth power switch at high level and turn off the sixth power switch and the seventh power switch at low level; when the first filter inductor and the second filter inductor are under the energy-storing operation, an energy-storing loop is sequentially formed by the DC input voltage, the third power switch, the second filter inductor, the AC output voltage, the first filter inductor, the second power switch, and the DC input voltage.

6. The DC-to-AC power conversion system in claim 2, wherein when the AC output voltage is under the negative half-cycle operation, the control circuit is configured to produce the complementary switching signal pair to switch the second power switch and the third power switch and turn off the first power switch and the fourth power switch at low level; and the control circuit is configured to produce the complementary level signal pair to turn on the fifth power switch and the eighth power switch at high level and turn off the sixth power switch and the seventh power switch at low level; when the first filter inductor and the second filter inductor are under the energy-releasing operation, an energy-releasing loop is sequentially formed by the second filter inductor, the AC output voltage, the first filter inductor, the fifth power switch, the sixth diode, the eighth power switch, the seventh diode, and the second filter inductor.

7. The DC-to-AC power conversion system in claim 1, wherein the first capacitor and the second capacitor are connected to a neutral point to maintain a voltage across the first capacitor and a voltage across the second capacitor are equal to a half of the DC input voltage.

8. A DC-to-AC power conversion system converting a DC input voltage into an AC output voltage, the DC-to-AC power conversion system comprising:
   an input capacitor set having a first capacitor and a second capacitor, and the first capacitor and the second capacitor connected to a neutral point and configured to receive the DC input voltage;
   a first bridge switching circuit connected in parallel to the input capacitor set, and the first bridge switching circuit having a first bridge arm and a second bridge arm connected in parallel to the first bridge arm; wherein the first bridge arm is composed of a first power switch and a fifth diode connected in series to the first power switch, and the second bridge arm is composed of a second power switch and a sixth diode connected in series to the second power switch;
   a first auxiliary switch circuit connected between the neutral point and the first bridge switching circuit, and the first auxiliary switch circuit having a third bridge arm and a fourth bridge arm connected in parallel to the third bridge arm; wherein the third bridge arm is composed of a third power switch and a seventh diode connected in series to the third power switch, and the fourth bridge arm is composed of a fourth power switch and an eighth diode connected in series to the fourth power switch;
   a second bridge switching circuit connected in parallel to the input capacitor set, and the second bridge switching circuit having a first bridge arm and a second bridge arm connected in parallel to the first bridge arm; wherein the first bridge arm is composed of a first power switch and a fifth diode connected in series to the first power switch, and the second bridge arm is composed of a second power switch and a sixth diode connected in series to the second power switch;
   a second auxiliary switch circuit connected between the neutral point and the second bridge switching circuit, and the second auxiliary switch circuit having a third bridge arm and a fourth bridge arm connected in parallel to the third bridge arm; wherein the third bridge arm is composed of a third power switch and a seventh diode connected in series to the third power switch, and the fourth bridge arm is composed of a fourth power switch and an eighth diode connected in series to the fourth power switch;
   a first filter circuit having a first filter inductor, a second filter inductor, and a filter capacitor; wherein the filter capacitor is connected between the first filter inductor and the second filter inductor, the first filter inductor is connected to the first bridge arm of the first bridge switching circuit and the third bridge arm of the first auxiliary switch circuit, and the second filter inductor is connected to the second bridge arm of the first bridge switching circuit and the fourth bridge arm of the first auxiliary switch circuit; and
   a second filter circuit having a first filter inductor, a second filter inductor, and the filter capacitor; wherein the filter capacitor is connected between the first filter inductor and the second filter inductor, the first filter inductor is connected to the first bridge arm of the second bridge switching circuit and the third bridge arm of the second auxiliary switch circuit, and the second filter inductor is connected to the second bridge arm of the second bridge switching circuit and the fourth bridge arm of the second auxiliary switch circuit; and
   a control circuit configured to produce a complementary switching signal pair and a complementary level signal pair; wherein the complementary switching signal pair is configured to control the first and second power switches of the first bridge switching circuit and the first and second power switches of the second bridge switching circuit, respectively; the complementary level signal pair is configured to control the third and fourth power switches of the first auxiliary switch circuit and the third and fourth power switches of the second auxiliary switch circuit, respectively;
   wherein the first auxiliary switch circuit is configured to provide the energy-releasing loops of the first filter inductor and the second filter inductor of the first filter circuit and the second auxiliary switch circuit is configured to provide the energy-releasing loops of the first filter inductor and the second filter inductor of the second filter circuit to reduce leakage currents of the DC input voltage caused by parasitic capacitance voltages.

9. The DC-to-AC power conversion system in claim 8, wherein the first power switch and the second power switch of the first bridge switching circuit are connected in parallel to a first diode and a second diode, respectively; the third power switch and the fourth power switch of the first auxiliary switch circuit are connected in parallel to a third diode and a fourth diode, respectively; the first power switch and the second power switch of the second bridge switching circuit are connected in parallel to a first diode and a second diode, respectively; the third power switch and the fourth power switch of the second auxiliary switch circuit are connected in parallel to a third diode and a fourth diode, respectively.

10. The DC-to-AC power conversion system in claim 9, wherein when the AC output voltage is under the positive half-cycle operation, the control circuit is configured to produce the complementary switching signal pair to switch the first power switch and the second power switch of the first bridge switching circuit and turn off the first power switch and the second power switch of the second bridge switching circuit; and the control circuit is configured to produce the complementary level signal pair to turn on the third power switch and the fourth power switch of the first auxiliary switch circuit at high level and turn off the third power switch and the fourth power switch of the second auxiliary switch circuit at low level; when the first filter inductor and the second filter inductor are under the energy-storing operation, an energy-storing loop is sequentially formed by the DC input voltage, the first power switch, the first filter inductor, the AC output voltage, the second filter inductor, the second power switch, and the DC input voltage.

11. The DC-to-AC power conversion system in claim 9, wherein when the AC output voltage is under the positive half-cycle operation, the control circuit is configured to produce the complementary switching signal pair to switch the first power switch and the second power switch of the first bridge switching circuit and turn off the first power switch and the second power switch of the second bridge switching circuit; and the control circuit is configured to produce the complementary level signal pair to turn on the third power switch and the fourth power switch of the first auxiliary switch circuit at high level and turn off the third power switch and the fourth power switch of the second auxiliary switch circuit at low level; when the first filter inductor and the second filter inductor are under the energy-releasing operation, an energy-releasing loop is sequentially formed by the first filter inductor, the AC output voltage, the second filter inductor, the fourth power switch, the eighth diode, the third power switch, the seventh diode, and the first filter inductor.

12. The DC-to-AC power conversion system in claim 9, wherein when the AC output voltage is under the negative half-cycle operation, the control circuit is configured to produce the complementary switching signal pair to switch the first power switch and the second power switch of the second bridge switching circuit and turn off the first power switch and the second power switch of the first bridge switching circuit; and the control circuit is configured to produce the complementary level signal pair to turn on the third power switch and the fourth power switch of the second auxiliary switch circuit at high level and turn off the third power switch and the fourth power switch of the first auxiliary switch circuit at low level; when the first filter inductor and the second filter inductor are under the energy-storing operation, an energy-storing loop is sequentially formed by the DC input voltage, the first power switch, the first filter inductor, the AC output voltage, the second filter inductor, the second power switch, and the DC input voltage.

13. The DC-to-AC power conversion system in claim 9, wherein when the AC output voltage is under the negative half-cycle operation, the control circuit is configured to produce the complementary switching signal pair to switch the first power switch and the second power switch of the second bridge switching circuit and turn off the first power switch and the second power switch of the first bridge switching circuit; and the control circuit is configured to produce the complementary level signal pair to turn on the third power switch and the fourth power switch of the second auxiliary switch circuit at high level and turn off the third power switch and the fourth power switch of the first auxiliary switch circuit at low level; when the first filter inductor and the second filter inductor are under the energy-releasing operation, an energy-releasing loop is sequentially formed by the first filter inductor, the AC output voltage, the second filter inductor, the fourth power switch, the eighth diode, the third power switch, the seventh diode, and the first filter inductor.

14. The DC-to-AC power conversion system in claim 8, wherein the first capacitor and the second capacitor are connected to a neutral point to maintain a voltage across the first capacitor and a voltage across the second capacitor are equal to a half of the DC input voltage.

15. A method of operating a DC-to-AC power conversion system, the DC-to-AC power conversion system converting a DC input voltage into an AC output voltage, the method comprising following steps:
(a) providing an input capacitor set, the input capacitor set having a first capacitor and a second capacitor, and the first capacitor and the second capacitor connected to a neutral point and configured to receive the DC input voltage;
(b) providing a bridge switching circuit, the bridge switching circuit connected in parallel to the input capacitor set, and the bridge switching circuit having a first bridge arm and a second bridge arm connected in parallel to the first bridge arm; wherein the first bridge arm is composed of a first power switch and a second power switch connected in series to the first power switch, and the second bridge arm is composed of a third power switch and a fourth power switch connected in series to the third power switch;
(c) providing an auxiliary switch circuit, the auxiliary switch circuit connected between the neutral point and the bridge switching circuit, and the auxiliary switch circuit having a third bridge arm and a fourth bridge arm connected in parallel to the third bridge arm; wherein the third bridge arm is composed of a fifth power switch and a sixth power switch connected in series to the fifth power switch, and the fourth bridge arm is composed of a seventh power switch and an eighth power switch connected in series to the seventh power switch;
(d) providing a filter circuit, the filter circuit having a first filter inductor, a second filter inductor, and a filter capacitor; wherein the filter capacitor is connected between the first filter inductor and the second filter inductor, the first filter inductor is connected to the first bridge arm and the third bridge arm, and the second filter inductor is connected to the second bridge arm and the fourth bridge arm; and
(e) providing a control circuit, the control circuit configured to produce a complementary switching signal pair and a complementary level signal pair; wherein the complementary switching signal pair is configured to control the first and fourth power switches and the second and third power switches, respectively; the complementary level signal pair is configured to control the sixth and seventh power switches and the fifth and eighth power switches, respectively.

16. The method of operating the DC-to-AC power conversion system in claim 15, wherein the first power switch, the second power switch, the third power switch, and the fourth power switch of the bridge switching circuit are connected in parallel to a first diode, a second diode, a third diode, and a fourth diode, respectively; the fifth power switch, the sixth power switch, the seventh power switch, and the eighth power switch of the auxiliary switch circuit are connected in parallel to a fifth diode, a sixth diode, a seventh diode, and an eighth diode, respectively; wherein the first capacitor and the second capacitor are connected to a neutral point to maintain a voltage across the first capacitor and a voltage across the second capacitor are equal to a half of the DC input voltage.

17. The method of operating the DC-to-AC power conversion system in claim 16, wherein when the AC output voltage is under the positive half-cycle operation, the control circuit is configured to produce the complementary switching signal pair to switch the first power switch and the fourth power switch and turn off the second power switch and the third power switch at low level; and the control circuit is configured to produce the complementary level signal pair to turn on the sixth power switch and the seventh power switch at high level and turn off the fifth power switch and the eighth power switch at low level; when the first filter inductor and the second filter inductor are under the energy-storing operation, an energy-storing loop is sequentially formed by the DC input voltage, the first power switch, the first filter inductor, the AC output voltage, the second filter inductor, the fourth power switch, and the DC input voltage.

18. The method of operating the DC-to-AC power conversion system in claim 16, wherein when the AC output voltage is under the positive half-cycle operation, the control circuit is configured to produce the complementary switching signal pair to switch the first power switch and the fourth power switch and turn off the second power switch and the third power switch at low level; and the control circuit is configured to produce the complementary level signal pair to turn on the sixth power switch and the seventh power switch at high level and turn off the fifth power switch and the eighth power switch at low level; when the first filter inductor and the second filter inductor are under the energy-releasing operation, an energy-releasing loop is sequentially formed by the first filter inductor, the AC output voltage, the second filter inductor, the seventh power switch, the eighth diode, the sixth power switch, the fifth diode, and the first filter inductor.

19. The method of operating the DC-to-AC power conversion system in claim 16, wherein when the AC output voltage is under the negative half-cycle operation, the control circuit is configured to produce the complementary switching signal pair to switch the second power switch and the third power switch and turn off the first power switch and the fourth power switch at low level; and the control circuit is configured to produce the complementary level signal pair to turn on the fifth power switch and the eighth power switch at high level and turn off the sixth power switch and the seventh power switch at low level; when the first filter inductor and the second filter inductor are under the energy-storing operation, an energy-storing loop is sequentially formed by the DC input voltage, the third power switch, the second filter inductor, the AC output voltage, the first filter inductor, the second power switch, and the DC input voltage.

20. The method of operating the DC-to-AC power conversion system in claim 16, wherein when the AC output voltage is under the negative half-cycle operation, the control circuit is configured to produce the complementary switching signal pair to switch the second power switch and the third power switch and turn off the first power switch and the fourth power switch at low level; and the control circuit is configured to produce the complementary level signal pair to turn on the fifth power switch and the eighth power switch at high level and turn off the sixth power switch and the seventh power switch at low level; when the first filter inductor and the second filter inductor are under the energy-releasing operation, an energy-releasing loop is sequentially formed by the second filter inductor, the AC output voltage, the first filter inductor, the fifth power switch, the sixth diode, the eighth power switch, the seventh diode, and the second filter inductor.

\* \* \* \* \*